Patented Mar. 26, 1946

2,397,093

UNITED STATES PATENT OFFICE 2,397,093

COATING COMPOSITION

Camille Dreyfus, New York, N. Y., and Bjorn Andersen, Maplewood, N. J., assignors to Celanese Corporation of America, a corporation of Delaware No Drawing. Application December 12, 1942, Serial No. 468,815

6 Claims. (Cl. 260—27)

This invention relates to coating compositions, and relates more particularly to coating compositions comprising polystyrene suitable for moisture-proofing sheet materials having a basis of cellulose acetate or other organic derivative of cellulose.

An object of our invention is to provide a moisture-proof coating for sheet materials having a basis of cellulose acetate or other organic derivative of cellulose.

Another object of our invention is to provide a moisture-proof coating for sheet materials having a basis of cellulose acetate or other organic derivative of cellulose which will be free of tackiness and cloudiness under all conditions of use.

Still another object of our invention is the provision of a moisture-proof coating for cellulose acetate sheet materials which may be heat-sealed at relatively low temperatures on the type of heat-sealing machines normally employed in industry.

Other objects of our invention will appear from the following detailed description.

Thin films or foils of cellulose acetate or other organic derivative of cellulose form excellent transparent wrapping materials. These materials, however, are not as impermeable to moisture as is often desired and cannot be employed in some applications where a high degree of moisture-impermeability is essential. Furthermore, although said films and foils are thermoplastic they cannot be heat-sealed without employing relatively high temperatures in the heat-sealing mechanism of the wrapping machines employed.

We have now discovered that thin films and foils having a basis of cellulose acetate or other organic derivative of cellulose may be rendered substantially impermeable to moisture and capable of being heat-sealed at relatively low temperatures by applying thereto certain coating compositions. We have found such coating compositions to be those comprising a homogeneous mixture of polystyrene, a wax and a resin, together with a plasticizer for these components, dissolved in a volatile liquid medium having substantially no solvent power for the base of the films or foils.

The waxes which may be employed in our novel coating compositions for improving moisture-impermeability are various naturally occurring and synthetic waxes such as, for example, paraffin wax, chlorinated naphthalenes and those waxes sold under the following names: "Flex-O-Wax C," "B Z Wax A," "Aristowax" and "Santowax," the latter being a high-melting, microcrystalline synthetic wax. Optimum results are obtained, however, by employing paraffin wax. Resins which have been found suitable in forming the coating composition of our invention for securing adhesion and heat-sealing qualities are ester gum, dammar gum, hydrogenated methyl abietate sold under the name "Hercolyn," chlorinated diphenyls known in the trade as "Arochlors," and toluene sulfonamide resins such as the "Santolites." Preferably, however, we employ ester gum. As plasticizers to secure pliability, compatibility of components, clarity, etc., we may employ, for example, dibutyl phthalate, distilled polymerized alpha-methyl-para-methyl styrene, tricresyl phosphate or triphenyl phosphate, the most suitable of these being tricresyl phosphate or distilled polymerized alpha-methyl-para-methyl styrene, prepared as more fully described in U. S. application S. No. 438,018, filed on April 7, 1942. In accordance with this co-pending application, the alpha-methyl-para-methyl styrene is polymerized in the presence of a small amount of stannic chloride as the polymerization catalyst. The polymerized alpha-methyl-para-methyl styrene is then distilled at a temperature of 147° to 184° C. at a pressure of one millimeter of mercury. The residue is a solid resin and the distillate is a polymerized alpha-methyl-para-methyl styrene which is a more active plasticizer than the undistilled polymerized alpha-methyl-para-methyl styrene.

As stated, the volatile liquid employed as the solvent medium for the components of our novel moisture-proof coating composition should be one which is a solvent for polystyrene but which has no solvent power for the cellulose acetate or other organic derivative of cellulose to which said composition is applied. Examples of such liquids are hydrocarbon solvents such as benzol, toluol, or xylol. Solvents or swelling agents for the cellulose acetate film or foil, such as acetone, ethylene dichloride, ethyl alcohol, etc., may be present in small amounts, say, 5 to 20% on the weight of the total solvent present, particularly for improving anchorage of coating and heat-sealing characteristics, but preferably we employ benzol, free of solvents or swelling agents for the cellulose acetate or other organic derivative of cellulose materials, as the volatile liquid solvent medium.

The proportions of plasticizer, resin, wax and polystyrene, as well as the amount of solvent, may be varied according to requirements. We have found that for about 100 parts by weight of polystyrene there may be employed from 5 to 50 parts of plasticizer, from 2 to 25 parts of resin, and from 2 to 25 parts of wax. The amount of solvent employed, i. e. benzol and the like, may be varied also depending on the method of applying the solution, i. e. dipping, spraying, etc., and from 300 to 1500 parts by weight have been found to be satisfactory.

In order further to illustrate our invention but without being limited thereto, the following examples are given:

Example I

A coating composition containing the following is prepared:

| | Parts by weight |
|---|---|
| Polystyrene | 100 |
| Tricresyl phosphate | 30 |
| Paraffin wax | 10 |
| Ester gum | 10 |
| Benzol | 1000 |

The solution is prepared by dissolving the desired amount of polystyrene in part of the benzol to form one solution, then dissolving the wax, ester gum and plasticizer in another part of the benzol to form a second solution. The two solutions are combined and additional benzol is added to bring the solution to the desired degree of dilution.

The coating composition of our invention may be applied to a cellulose acetate foil which is, say, .001 inch in thickness in a film about .00005 inch in thickness by means of an automatic coating machine. The coated foil possesses a very low permeability to moisture and is water resistant. In addition, the coated foil possesses high clarity, is free of tackiness and may be sealed by a heat-sealing device operating at temperatures as low as 200 to 240° F.

Example II

The following coating composition is prepared:

| | Parts by weight |
|---|---|
| Polystyrene | 100 |
| Distilled polymerized alpha-methyl-para-methylstyrene | 45 |
| "Santowax" (high melting point microcrystalline synthetic wax) | 20 |
| Gum dammar | 5 |
| Xylol | 750 |

When coated on a cellulose acetate foil .002 inch thick in a layer .0001 inch in thickness, the coated foil which is obtained exhibits very low moisture-permeability and high water resistance. Furthermore, the coated foil possesses high clarity, is free of tackiness and, in addition, may be heat-sealed at relatively low temperature.

While our invention has been described with particular reference to the coating of films and foils having a basis of cellulose acetate, films and foils having a basis of other organic derivatives of cellulose may be coated in like manner and the characteristics thereof improved. Examples of such other organic derivatives of cellulose are cellulose esters such as cellulose propionate, cellulose butyrate and mixed esters such as cellulose acetate-propionate and cellulose acetate-butyrate, and cellulose ethers such as ethyl cellulose and benzyl cellulose. Other materials such as paper, cloth and the like may also be coated with our novel coating compositions. Our coating compositions may also be pigmented, if desired.

The films or foils employed may be of a thickness of from .0005 to .010 inch or more. They may be prepared by casting or flowing a solution of the desired cellulose derivative dissolved in a volatile solvent on to a smooth metallic or glass surface such as film wheels, bands, tables, etc. The volatile solvent is caused to evaporate and leaves the film or foil behind on the surface on which the solution was cast or flowed. The solution from which the films or foils are prepared may contain plasticizers, dyes, or effect materials, if desired.

Coated foils prepared in accordance with our invention may be employed very satisfactorily for wrapping tobacco products and various foodstuffs where moisture-impermeability is essential. By employing our novel coated foils for wrapping purposes, it is possible to retain the moisture which is originally present in the wrapped material or to prevent the absorption of excess moisture from the air where the material which is wrapped is somewhat hygroscopic and tends to absorb moisture. Our improved moisture resistant foils and sheets also find useful application in the electrical industry owing to their improved electrical insulating qualities. Cellulose acetate sheets coated with our compositions show improved scribing or recording as well as sound reproducing qualities when used for sound or phonograph records.

It is to be understood that the foregoing detailed description is given merely by way of illustration and that many variations may be made therein without departing from the spirit of our invention.

Having described our invention, what we desire to secure by Letters Patent is:

1. A coating composition adapted to impart moisture impermeability to materials coated therewith, comprising a solution of polystyrene, a wax, another thermoplastic resin and as the sole plasticizer the distillate obtained by distilling polymerized alpha-methyl-para-methyl styrene at a temperature between 147° and 184° C. at a pressure of one millimeter of mercury.

2. A coating composition adapted to impart moisture impermeability to materials coated therewith, comprising a solution of polystyrene, a synthetic wax, another thermoplastic resin and as the sole plasticizer the distillate obtained by distilling polymerized alpha-methyl-para-methyl styrene at a temperature between 147° and 184° C. at a pressure of one millimeter of mercury.

3. A coating composition adapted to impart moisture impermeability to materials coated therewith, comprising a solution of polystyrene, paraffin wax, ester gum, and as the sole plasticizer the distillate obtained by distilling polymerized alpha-methyl-para-methyl styrene at a temperature between 147° and 184° C. at a pressure of one millimeter of mercury.

4. A coating composition adapted to impart moisture impermeability to materials coated therewith, comprising 100 parts by weight of polystyrene, from 2 to 25 parts by weight of wax, from 2 to 25 parts by weight of another thermoplastic resin and from 5 to 50 parts by weight of the distillate obtained by distilling polymerized alpha-methyl-para-methyl styrene at a temperature between 147° and 184° C. at a pressure of one millimeter of mercury as the sole plasticizer.

5. A coating composition adapted to impart moisture impermeability to materials coated therewith, comprising 100 parts by weight of polystyrene, from 2 to 25 parts by weight of synthetic wax, from 2 to 25 parts by weight of gum dammar, from 5 to 50 parts by weight of the distillate obtained by distilling polymerized alpha-methyl-para-methyl styrene at a temperature between 147° and 184° C. at a pressure of one millimeter of mercury as the sole plasticizer, and from 300 to 1500 parts by weight of xylol as solvent.

6. A coating composition adapted to impart moisture impermeability to materials coated therewith, comprising 100 parts by weight of polystyrene, 45 parts by weight of the distillate obtained by distilling polymerized alpha-methyl-para-methyl styrene at a temperature between 147° and 184° C. at a pressure of one millimeter of mercury as the sole plasticizer, 20 parts by weight of a high melting point microcrystalline synthetic wax, 5 parts by weight of gum dammar and 750 parts by weight of xylol.

CAMILLE DREYFUS.
BJORN ANDERSEN.